(12) United States Patent
McClure et al.

(10) Patent No.: US 7,144,065 B2
(45) Date of Patent: Dec. 5, 2006

(54) VEHICLE LIFTGATE WITH ACCESSORY COMPONENT MODULE

(75) Inventors: William Ethan A. McClure, Clawson, MI (US); Philippe Gougeon, Bloomfield Hills, MI (US); William C. Romesburg, Troy, MI (US); Leonida S. Vaitus, Windsor (CA)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 270 days.

(21) Appl. No.: 10/331,929

(22) Filed: Dec. 30, 2002

(65) Prior Publication Data

US 2004/0124664 A1 Jul. 1, 2004

(51) Int. Cl.
*B60J 5/10* (2006.01)
*E05B 15/02* (2006.01)
*E05B 17/14* (2006.01)

(52) U.S. Cl. ............................ 296/146.8; 296/96.15; 296/96.17; 296/106; 292/341.15

(58) Field of Classification Search .. 296/96.15–97.17, 296/106, 146.1, 146.2, 146.8; 292/341.15, 292/DIG. 29
See application file for complete search history.

(56) References Cited

U.S. PATENT DOCUMENTS

| | | | | |
|---|---|---|---|---|
| 4,722,206 A | * | 2/1988 | Nakamura et al. | ............. 70/240 |
| 5,035,449 A | * | 7/1991 | Shiratori et al. | ............... 292/48 |
| 5,621,942 A | * | 4/1997 | Eustache et al. | ........... 15/250.3 |
| 5,653,012 A | * | 8/1997 | Pasternak et al. | .......... 29/281.4 |
| 6,019,418 A | | 2/2000 | Emerling et al. | |
| 6,123,384 A | * | 9/2000 | Eustache et al. | ......... 296/146.2 |
| 6,131,989 A | | 10/2000 | Montone et al. | |
| 6,216,309 B1 | | 4/2001 | Goto et al. | |
| 6,234,564 B1 | | 5/2001 | Kim | |
| 6,237,185 B1 | | 5/2001 | Goto et al. | |
| 6,240,593 B1 | * | 6/2001 | Murata | ...................... 15/250.3 |
| 6,435,596 B1 | | 8/2002 | Pyo | |
| 6,523,882 B1 | * | 2/2003 | Ishikawa et al. | ......... 296/146.8 |
| 6,637,801 B1 | * | 10/2003 | Eustache et al. | ............ 296/106 |
| 2001/0001336 A1 | | 5/2001 | Kobayashi et al. | |
| 2001/0011831 A1 | | 8/2001 | Ohashi et al. | |

FOREIGN PATENT DOCUMENTS

| | | |
|---|---|---|
| EP | 0 916 559 | 5/1999 |
| EP | 1 074 442 | 2/2001 |
| EP | 1 083 101 | 3/2001 |
| GB | 2 327 598 | 2/1999 |
| GB | 2 347 340 | 9/2000 |
| JP | 11 301420 | 11/1999 |
| JP | 2000062575 | 2/2000 |
| JP | 20000326830 | 11/2000 |

* cited by examiner

*Primary Examiner*—D. Glenn Dayoan
*Assistant Examiner*—Greg Blankenship
(74) *Attorney, Agent, or Firm*—Young Basile

(57) ABSTRACT

A unitary vehicle liftgate component module carries a plurality of pre-mounted vehicle liftgate components for one-step mounting on the liftgate when the module is attached to the liftgate. At least two of a liftgate wiper motor, a liftgate window latch, and liftgate window defrost terminal connectors are carried on the module or interact with portions carried on the module. In one aspect, the liftgate window latch striker and an optional electrical contact are carried on a support which is laterally adjustable with respect to a base fixed to the liftgate window for automatic centering of the striker and the optional contact as the liftgate window is moved to a closed position with respect to an opening in the liftgate.

16 Claims, 8 Drawing Sheets

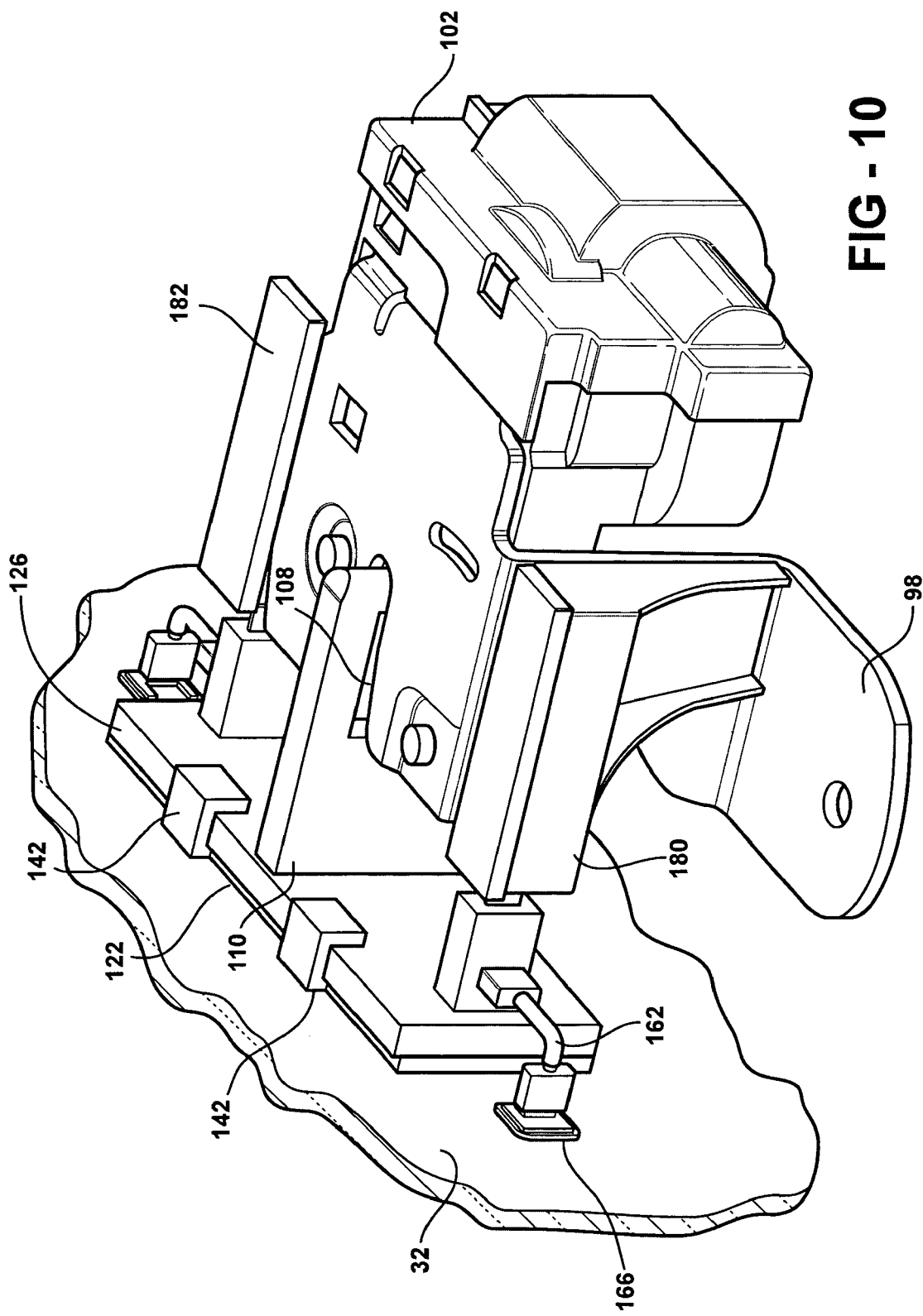

VEHICLE LIFTGATE WITH ACCESSORY COMPONENT MODULE

BACKGROUND

The present invention relates, in general, to motor vehicle liftgates or rear hatches and, more specifically, to accessory components mounted on such vehicle liftgate or rear hatches.

In modern vehicles, larger vehicles such as SUVs, vans and station wagons have a liftgate or rear hatch which closes a rear opening in the vehicle body. The liftgate is pivotally attached, usually by hinges, to the vehicle body structure surrounding the rear opening. The liftgate is releasably latchable to the vehicle structure by a latch mechanism so as to be movable between a closed position latched to the vehicle body structure and a pivoted, open position allowing access to the interior of the vehicle through the rear opening.

The liftgate itself is formed of a panel structure, which is stamped or otherwise formed into a panel having an upper opening for receiving a glass window. An interior trim panel is attachable to the liftgate panel to cover components mounted on the gate.

The liftgate forms a platform for a number of different accessories or components, such as a flipglass latch, a wiper motor and associated wiper arm, license plate lights, and a wash pump and/or wash nozzle. Various lights as well as the center high mounted stop light may also be mounted on the liftgate along with the liftgate latch mechanism. Other components which are usually mounted on the liftgate can include electrical contact connections to the defrost grid mounted on the liftgate glass or fiberglass.

All of these accessories or components are manufactured separately from the liftgate panel structure and are mounted, usually one at a time, on the liftgate while the vehicle is being assembled. The mounting of each component on the liftgate panel either directly or through brackets typically requires mechanical fasteners and, usually, an electrical connection via a plug-in connector, screw terminal, etc. All of the mounting procedures, and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the liftgate.

As can be seen, all of these factors lead to a substantial assembly time for the liftgate thereby resulting in a higher than desirable cost. To address these problems, a modular approach has been proposed in which several components are separably manufactured, pretested, and assembled into a single module, with only the module having to be mounted in a single operation on a liftgate. The number of separate mechanical fasteners and electrical connections can also be reduced by this modular approach. However, the modular approach has been proposed only for a limited number of components. This has resulted in less than anticipated savings in assembly time and labor.

Thus, it would be desirable to provide an improved modular component apparatus for vehicle liftgates in which multiple components are mounted in a single module for a single installation on the liftgate thereby improving reliability and reducing assembly costs. It would also be desirable to provide a modular component apparatus for a vehicle liftgate which has pre-aligned connection points, combined mounting points, and reduced weight which provides an increased glass viewing area.

SUMMARY

The present invention is an accessory component module for a vehicle liftgate which unitarily carries a plurality of components which can be mounted on a vehicle liftgate in a single assembly operation when the module itself is mounted on the liftgate.

In one aspect, the present module includes a unitary frame and a variety of vehicle components mounted on the frame. The vehicle components include at least two of a liftgate window wiper motor, a liftgate flipglass latch apparatus and flipglass defrost grid connectors.

In another aspect, at least one electrical contact blade projects from a base fixed to a liftgate window. An electrical connector is carried on the module and slidably receives the contact blade when the liftgate window is moved to a closed position.

In another aspect, a cover is mountable over the at least one electrical contact blade. Means are provided for biasing the cover to a first position which the cover substantially encompasses the electrical contact blade. However, the cover is able to be moved to a second position upon contact with the module when the liftgate window is moved to a closed position, in which second position the contact blade projects through the cover for insertion into the connector on the module.

In another aspect, means carrying a striker latch are coupled to a liftgate window and provide lateral adjustment of the striker with respect to the liftgate latch to center the striker in the latch when the liftgate window is moved to the closed position. Although the striker itself can be laterally adjustable by itself, additional advantages are realized if the striker and the electrical contact blade are mounted on a support carrying the striker for lateral adjustment with the striker to enable the contact blade to be centered for insertion into the mating electrical connectors.

The accessory component module of the present invention provides significant advantages over previous liftgate accessory or component mounting methods by incorporating a plurality of liftgate components into a unitary module which can be attached to the liftgate in a single assembly operation. This improves the reliability of the components since the components can be preassembled, pretested and even pre-wired either before or after mounting on the module. The number of workers required to mount all of the components on the liftgate in the vehicle assembly line is reduced along with line length and assembly time. This reduces the overall costs of the liftgate for more economical and efficient manufacturing operation.

In addition, the number of electrical connectors and mechanical connection points are reduced for the liftgate to again reduce assembly time, cost and to improve reliability.

BRIEF DESCRIPTION OF THE DRAWING

The various features, advantages and other uses of the present invention will become more apparent by referring to the following detailed description and drawing in which:

FIG. 10 is a perspective view, similar to FIG. 5, but without the defrost contact cover;

DETAILED DESCRIPTION

Figure 1:
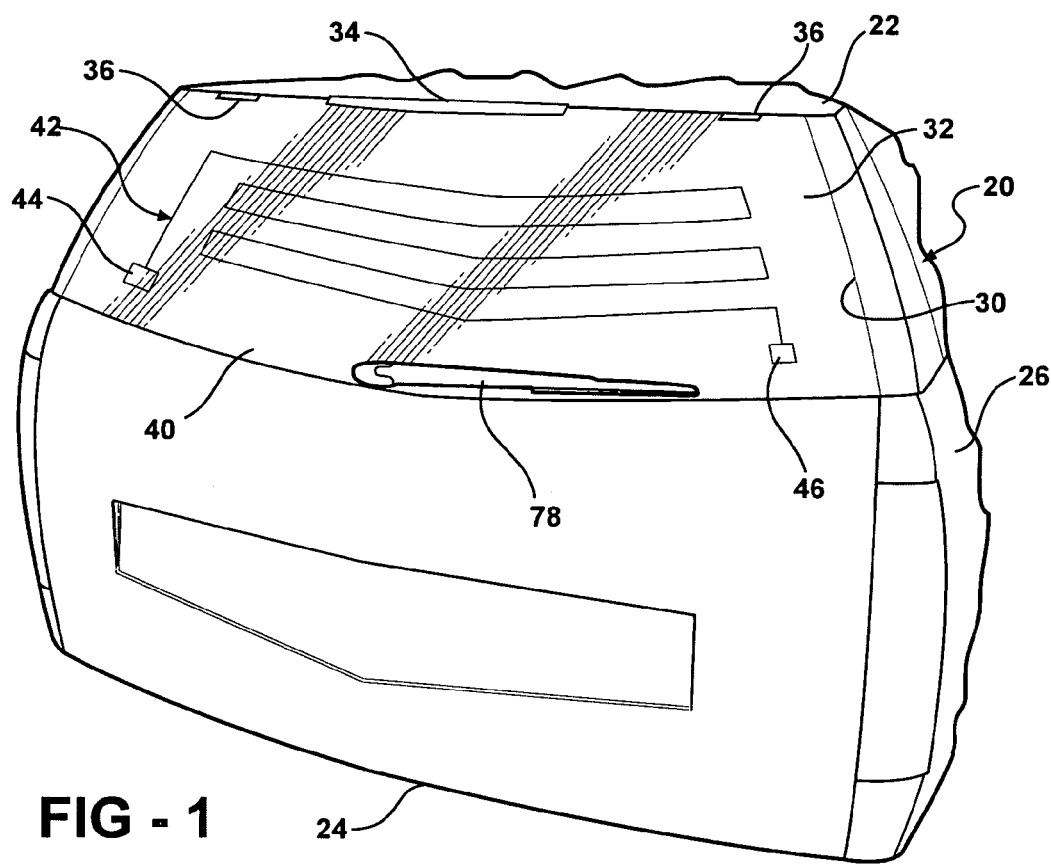
FIG. 1 is a front exterior elevational view of an exemplary vehicle liftgate utilizing the component module according to the present invention.

Referring now to the drawing, and to FIG. 1 in general, there is depicted a pictorial representation of a motor vehicle liftgate or rear hatch 20. The shape of the liftgate 20 will vary from vehicle to vehicle.

The liftgate 20 is intended, by example only, to be articulated or pivoted about an upper generally horizontally extending edge 22 by means of hinges attached to the surrounding vehicle body structure, not shown. When the liftgate 20 is pivotally mounted about the upper edge 22, the latch means will normally be associated with an opposed bottom edge 24. The liftgate 20 may also be articulated to the vehicle body about a vertical axis on one of the lateral side edges, with the opposite lateral edge carrying a locking means for securing the liftgate 20 in a fixed position closing the rear opening in the vehicle.

Figure 2:
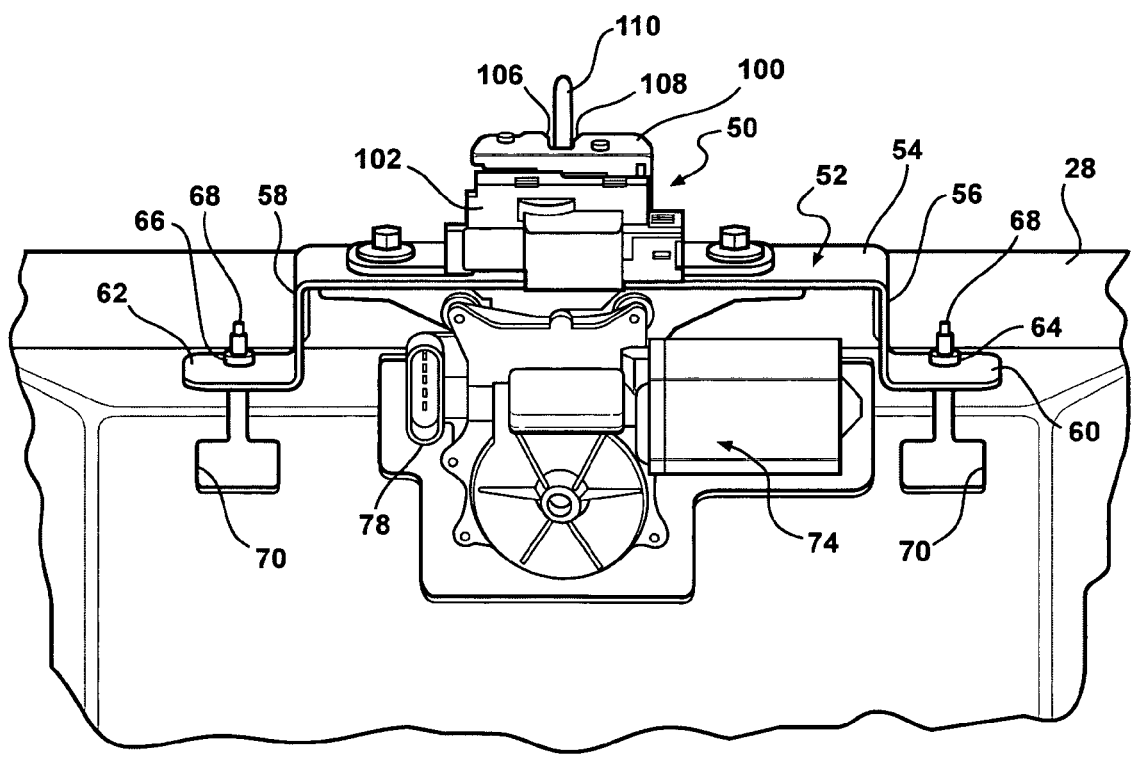
FIG. 2 is a perspective interior view of the inventive module shown mounted on the inner liftgate panel.

The liftgate 20 may be formed using any conventional manufacturing process, such as an outer panel 26 which is joined to an inner panel 28, shown in FIG. 2.

An aperture or opening 30 is formed in the liftgate 20. The aperture 30 is closed by a transparent panel 32, such as a glass window. The window 32 may be fixedly attached to the rear liftgate panel 26 or, articulated itself about an upper generally horizontally extending edge 34 to the upper edge portion of the liftgate 20 by means of one or more hinges 36 for pivotal movement of the opposed bottom end 40 between a closed position, sealed to the liftgate 20 and an open, pivotal position spaced from the adjacent portions of the outer liftgate panel 26. Such an articulated glass or window is commonly referred to as a flipglass.

As is common, a defrost grid 42 is mounted in or on the glass window 32. Opposed ends of the defrost grid 42 terminate in electrical connections or pads 44 and 46.

Any portion of the window 32 may be covered by an internally mounted plate or sheet, typically covering the defrost contact pads 44 and 46 as well as lateral or side portions to define a central transparent vision portion in the glass window 32.

Referring now to FIGS. 2–12, there is depicted a module 50 used for unitarily mounting one or more vehicle accessories or components in a one step assembly operation to the liftgate 20.

The module 50 includes a mounting means in the form of a bracket 52. The bracket 52 includes a center leg 54 having a plurality of apertures extending therethrough for receiving fasteners as described hereafter, side legs 56 and 58 and laterally extending mounting flanges 60 and 62. The mounting flanges 60 and 62 each include a boss or sleeve 64 and 66, respectively, having an internally threaded bore extending therethrough. The bores 64 and 66, which extend through the mounting flanges 60 and 62, respectively, are adapted for receiving a suitable fastener 68, such as a TORX type fastener. The fastener 68 has an enlarged head which is capable of receiving an even larger diameter washer and/or vibration dampening, resilient grommet. The head of the fastener 68 and the attached washer and/or grommet are insertable through key hole shaped apertures 70 formed in the latch gate inner panel 28, with the shank of the fasteners 68 being threadable through the threaded bore in the bosses 64 and 66. The upper end of each fastener 68 is formed to receive a TORX type driver for tightening the opposed head of the fastener 68 against the underlying latch gate inner panel 28 to fixedly mount the bracket 52 to the latch gate inner panel 28.

One of the components mounted on the module 50 is a wiper assembly drive motor and transmission, all denoted by reference number 74. A drive shaft 76, shown in FIG. 4, projects outwardly from the gear transmission and receives one end of a wiper arm denoted pictorially by reference number 78 in FIG. 1. The motor 74 is designed to reciprocally move the wiper arm 78 over the window 32 for cleaning an area of the window 32.

A wash fluid nozzle may be provided as part of the motor 74, such as through the motor output shaft 76 as described in U.S. Pat. No. 6,019,292. A fluid conduit, not shown, may be connected to the nozzle to supply wash fluid from a separately located wash fluid reservoir, also not shown.

Electrical connections are made to the motor 74, such as through a plug-in connector 78 carried on the housing of the motor 74.

Figure 3:
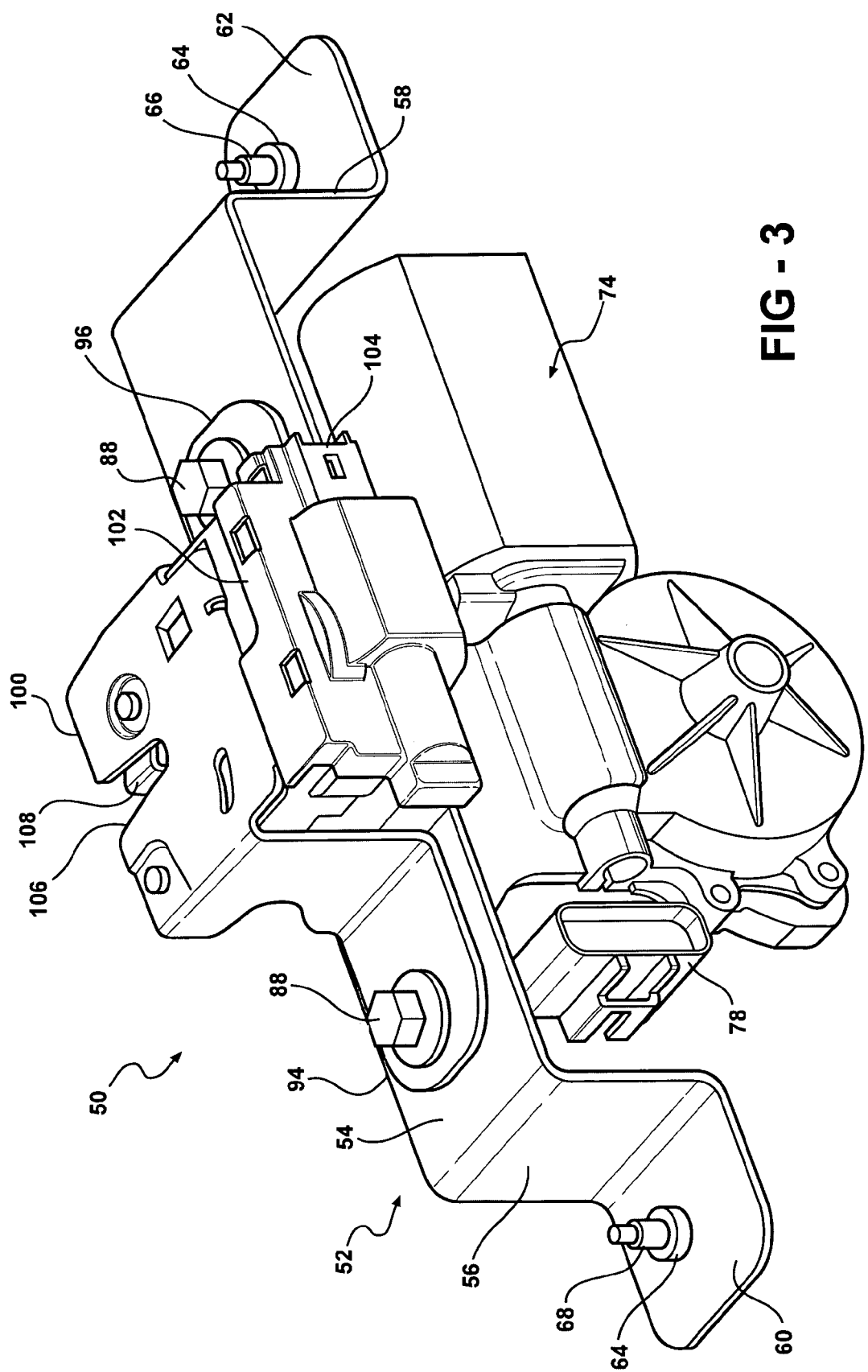
FIG. 3 is a perspective view of the module shown in FIG. 2.
Figure 4:
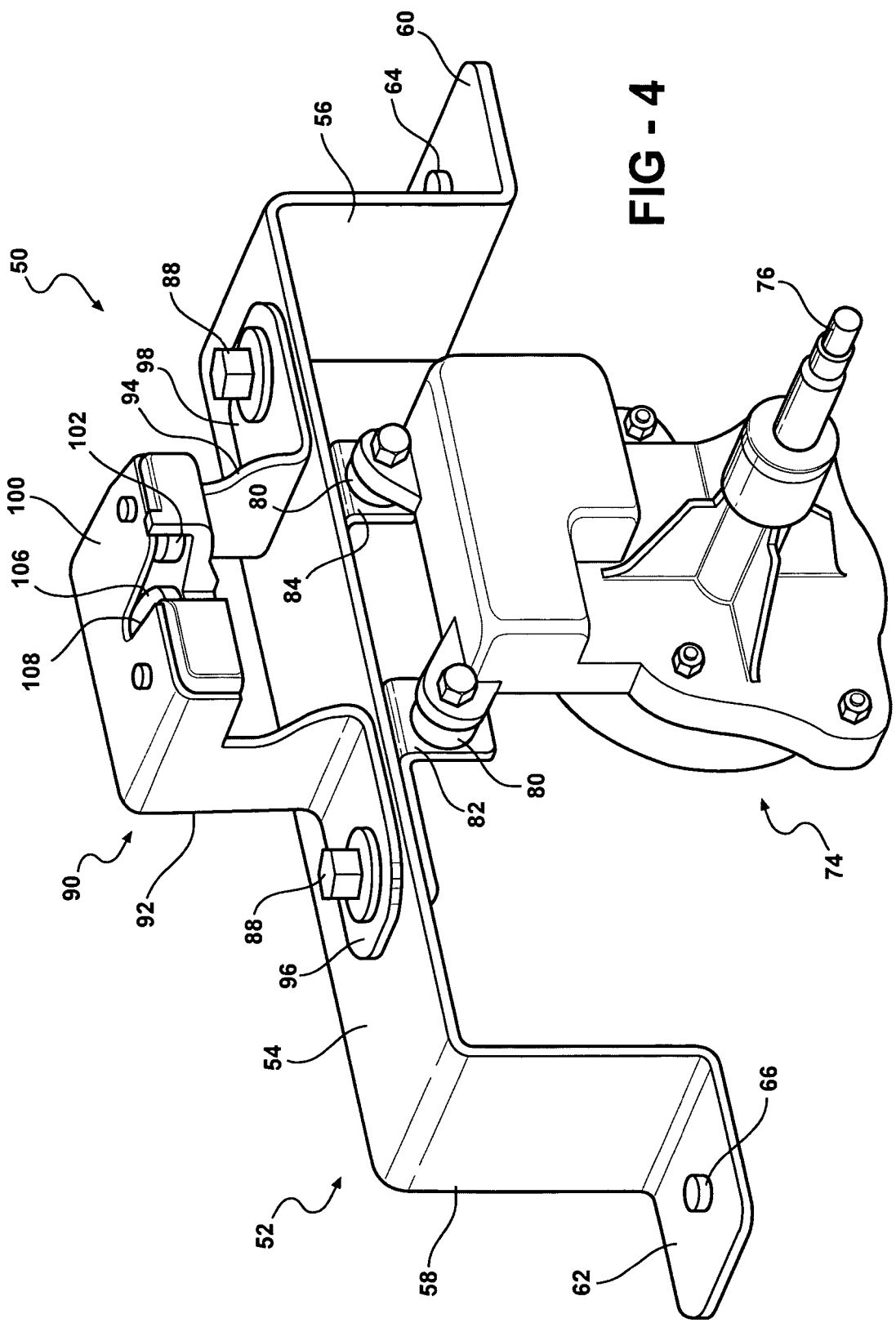
FIG. 4 is a perspective view of the module taken in an opposite direction from FIG. 3.
Figure 5:
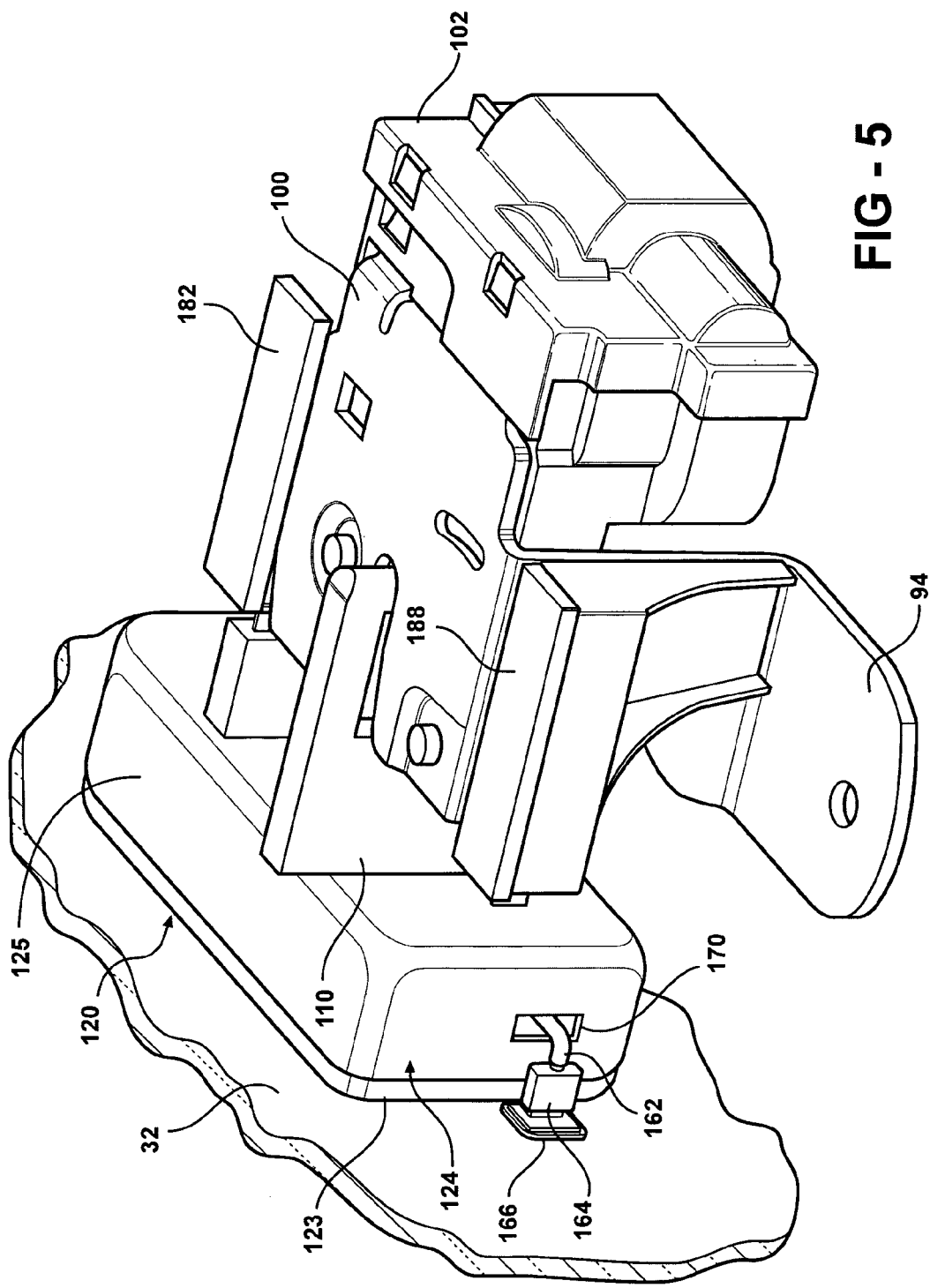
FIG. 5 is a perspective view of the window latch and defrost contact connections of the module shown in FIGS. 2–4.

As shown in FIGS. 2–4, grommets 80 are interposed between mounting portions of the bracket 52 and mounting arms 82 and 84. The grommets 80 receive fasteners through apertures in the mounting arms 82 and 84. The mounting arms 82 and 84 may be integrally formed as part of the motor housing or as separate members attached to the motor housing.

The ends of the mounting arms 82 and 84 are positioned for engagement with the central leg 54 of the mounting bracket 52. Fasteners, such as a nut and bolt, both denoted by reference number 88, are insertable through apertures in the ends of the mounting arms 82 and 84, the central leg 54 of the mounting bracket 52, for securing the mounting arms 82 and 84 and the attached motor 74 to the bracket 52, and the grommets 80.

The module 50 also includes a second mounting or latch bracket 90 affixed to the mounting bracket 52, such as on the central leg 54, by means of the same fasteners 88 used to receive the mounting arms 82 and 84 carrying the motor 74. The latch bracket 90 is formed, by example, of opposed side legs 92 and 94, central leg 100, and opposed outwardly extending flanges 96 and 98, all formed as a unitary, one piece member from a bent or otherwise formed metal strip.

It will be understood that the latch bracket 90 which typically is always present with the latch mechanism 102, could be combined with the bracket 52 into a single bracket with the same mounting connections to the latch mechanism 102, the wiper motor 74 and the liftgate 20.

In use, a window latch mechanism 102 is mounted to the latch bracket 90. Likewise, the wiper motor 74 is mounted via the mounting arms 80 and 82 to the bracket 52. In addition, the required electrical connections for operation of the latch 102 and the motor 74 may be pre-wired or connected so that a single plug or connector can be connected to the connector 78 on the wiper motor 74 housing for providing electrical power and activating signals to the wiper motor 74 and/or the latch 102. Alternately, the wiper motor controller could also control the latch 102. The entire module 50 may then be mounted via the fasteners 68 to the liftgate inner panel 28 as described above.

Referring now to FIGS. 5–12, there is depicted another aspect of the module 50 which may is typically employed with the flipglass latch 102, but which can be used with or without the wiper motor 74 as part of the module 50.

In one aspect shown in FIGS. 5–11, a rear glass striker defrost mechanism 120 is mounted on the liftgate flipglass 32, generally adjacent a bottom, central edge of the flipglass 32. The striker defrost mechanism 120 includes a cover 124 which is mounted on a base 122.

The base 122 is fixed to the flipglass 32 by either bonding or using fasteners. The striker 110 is encased by a single or multiple terminal body insulator 126 that could either be overmolded onto the striker 110 or a separate part(s) that would surround the striker 110. The purpose of the terminal body insulator 126 is to secure the terminals 154 and 156 and provide electrical insulation between the striker 110 and the base 122. The striker 110 and surrounding terminal body insulator 126 are secured to the base 122 by either a capturing design, as shown in FIGS. 5–12, or by fasteners, not shown, which enable the insulator 126 to slide laterally relative to the base.

The base 122 has a plurality of opposed pairs of arms or flanges 142 which slidably receive the insulator 126.

Figure 9:
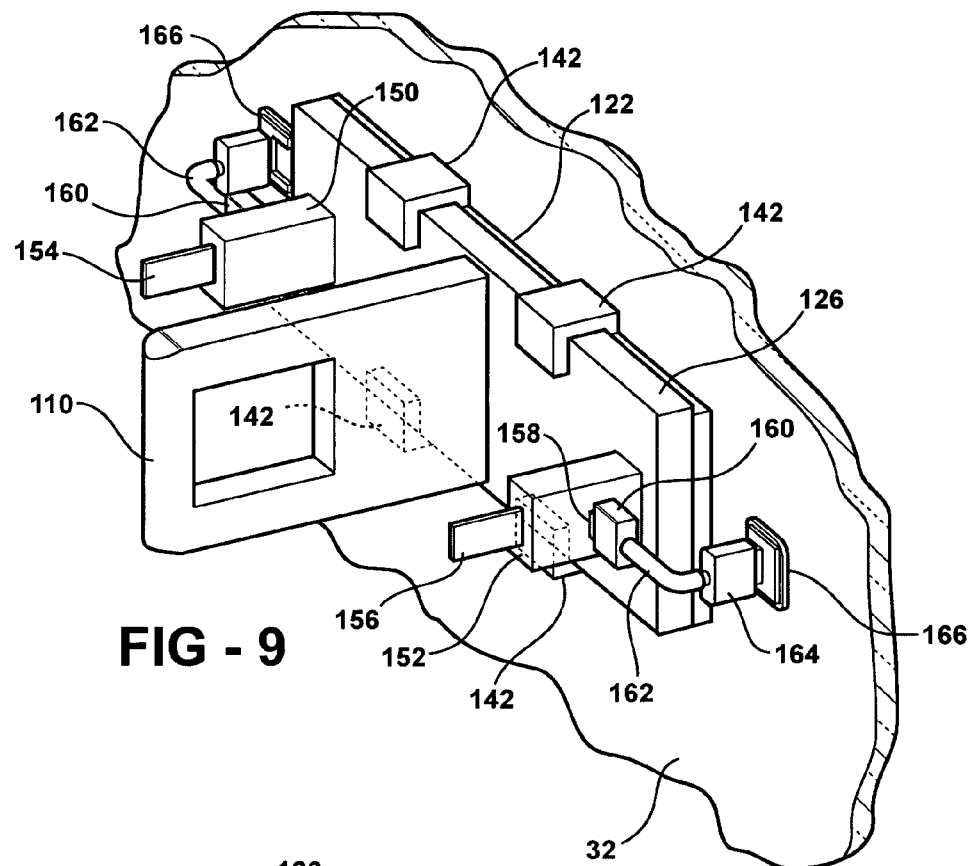
FIG. 9 is a perspective view of the inner components of the defrost contact and striker connections shown in FIGS. 5–8.
Figure 11:
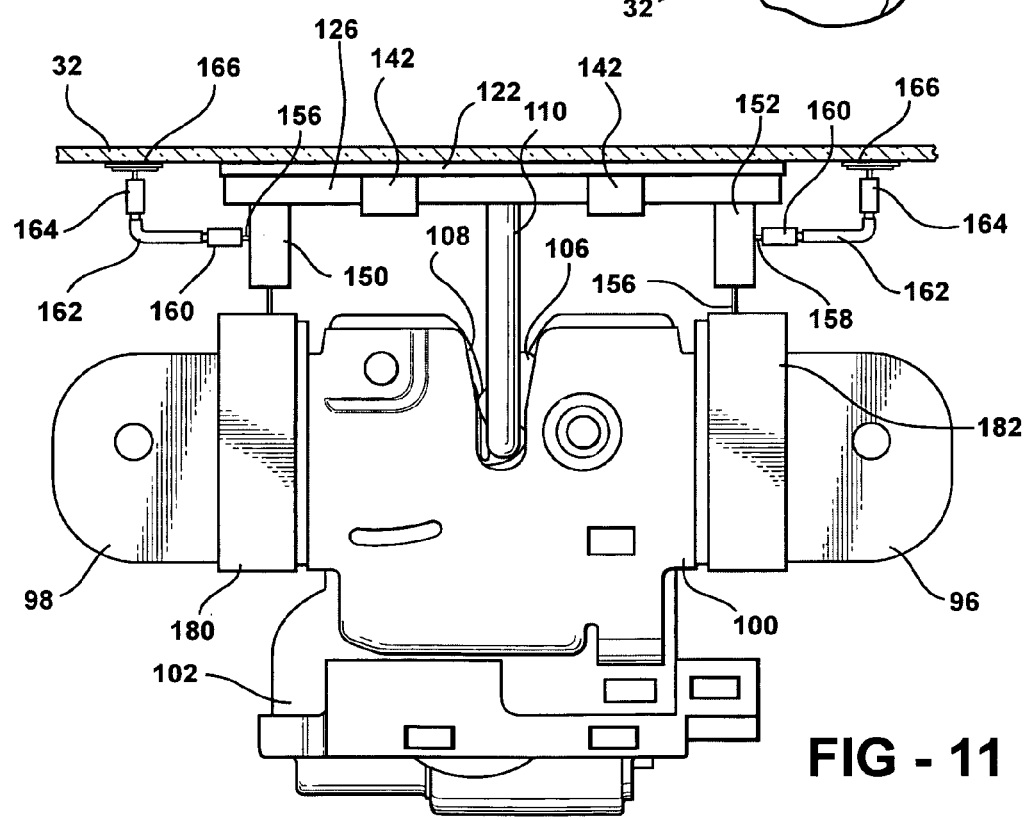
FIG. 11 is a plan elevational view of the defrost contact and striker connections of the module shown in FIG. 10.

A pair of contact bosses 150 and 152 are integrally molded with the insulatior 126. Each boss 150 and 152 is over-molded about a contact blade 154 and 156, respectively, which projects laterally from each boss 150 and 152 away from the insulation 126 as shown in FIG. 9. An inner end of the blades 154 and 156 is connected to a short blade 158 which receives a plug connector 160 on one end of a harness 162, the other end of which carries plug 164 connected to a contact pad 166 which is fixedly attached to the flipglass 32 and to the defrost grid 42.

The terminals 154 and 156 in this example are used to transfer electrical power for the flipglass defrost system, but are not limited for this use alone. The harnesses 160 transfer power between the terminals 154 and 156 and the defrost terminals 166 attached to the defrost grid 42. The terminals 154 and 156 and the harnesses 160 could also be used for other electrical flipglass mounted components.

Figure 6:
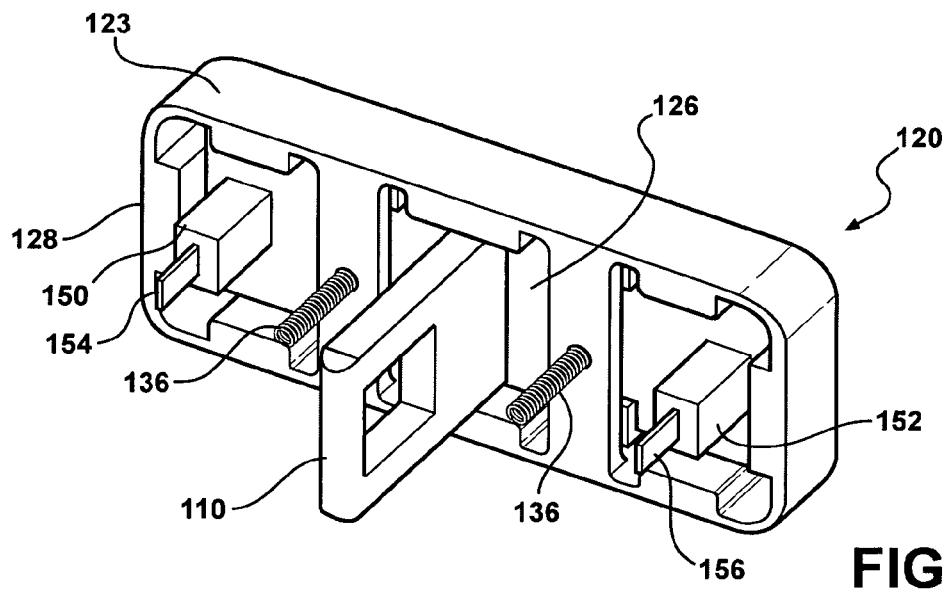
FIG. 6 is a perspective view of a portion of the defrost contact connections shown in FIG. 5.
Figure 7:
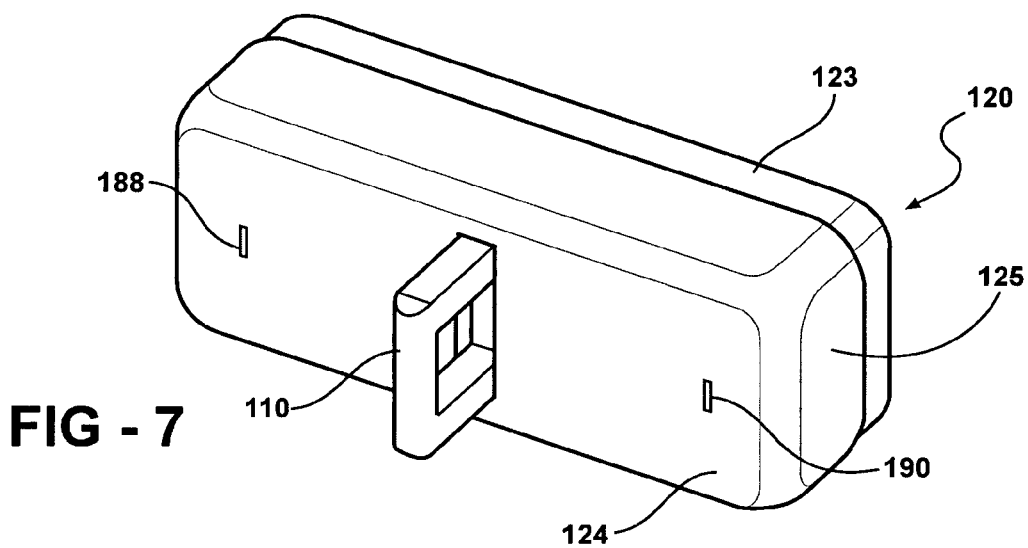
FIG. 7 is a perspective view of the complete defrost contact and latch striker shown in a liftgate open position.
Figure 8:
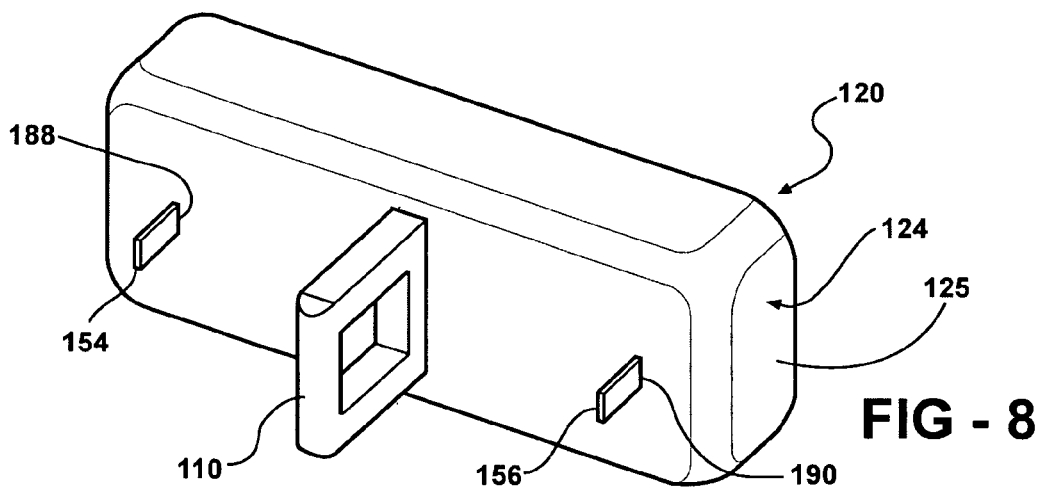
FIG. 8 is a perspective view, similar to FIG. 7, but showing the defrost contact connections in an exposed contact, window open position.

Shown in FIGS. 6, 7 and 8 is the spring loaded cover assembly 124 that covers the striker/defrost assembly 120. The spring loaded cover assembly 124 allows the terminals 154 and 156 to be hidden when the flipglass 32 is open, aids in the opening of the flipglass 32, and/or hides the striker defrost assembly 120. The spring loaded cover assembly 124 has an inner cover 123, an outer cover 125, and one or more biasing springs 136. The inner cover 123 is secured to either the base 122, striker 110, or terminal body insulator 126 by locking design features, such as clips, fasteners, or bonding. When the inner cover 123 is secured to the striker 110 and/or the terminal body insulator 126, the spring loaded cover assembly 124 will slide, relative to the base 122 with the striker 110. Alternatively, when secured to the base 122 it would not move with the striker 110 and/or the terminal body insulator 126.

The outer cover 125 is secured to the inner cover 123 either by locking design features on the inner wall(s) of the outer cover 125 and/or the outer wall(s) of the inner cover 123, or fasteners, dependent on the design and requirements for the application. The outer cover 125 slides over the inner cover 123, enveloping it, when the front of the outer cover 125 is forced back. The spring(s) 136, control the amount of force required to move the outer cover 125, and are responsible for pushing the outer cover 125 back out once the force is removed. FIG. 8 shows the outer cover 125 pushed back, with the spring(s) 136 compressed, exposing the terminals 154, 156 through apertures 188 and 190 in the outer cover 125.

FIG. 7 shows the outer cover 125 in the neutral position with the spring(s) 136 uncompressed and the terminals 152, 154 hidden. FIG. 7 also shows what the entire assembly 120 would look like when the flipglass 32 is open.

Figure 12:
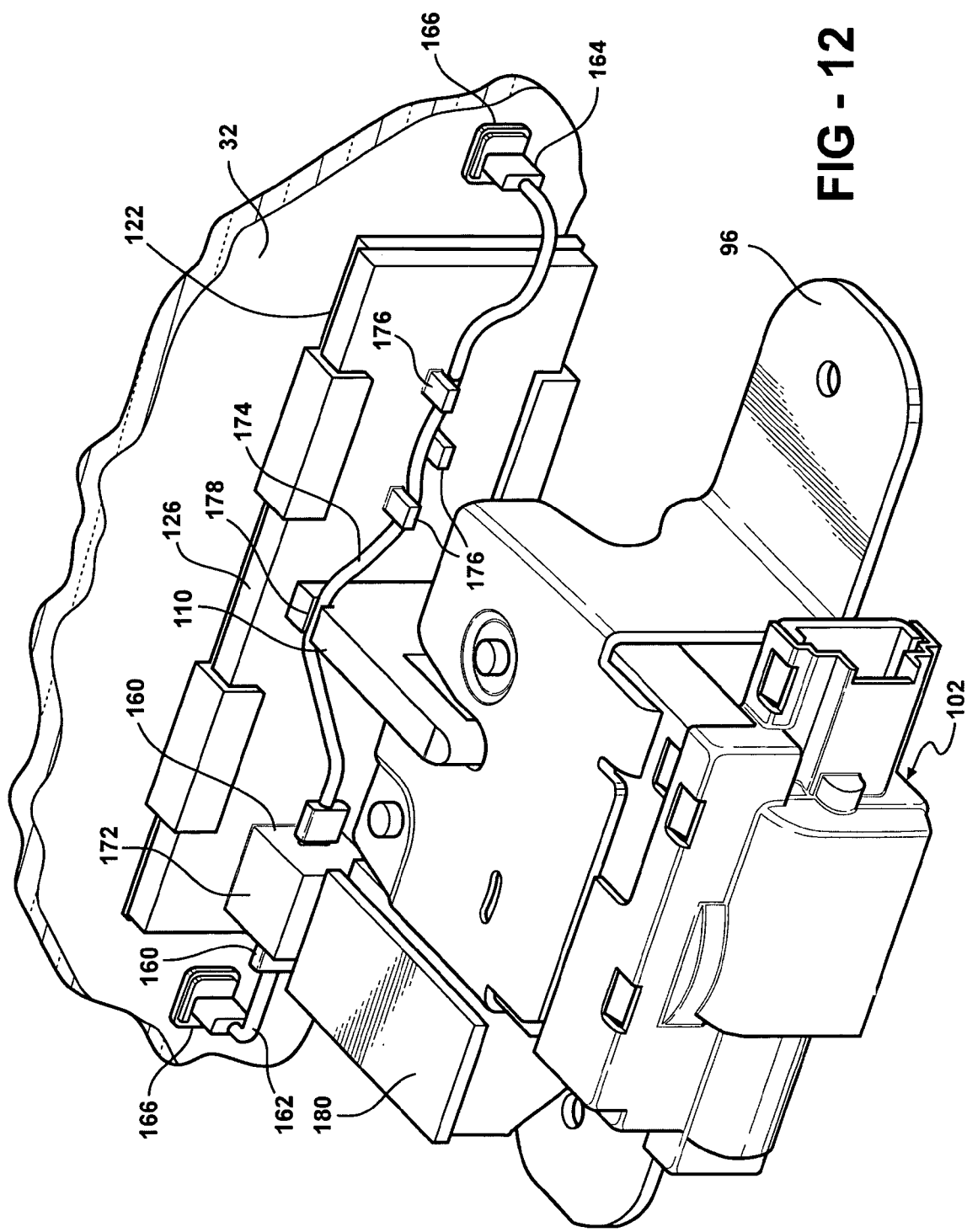
FIG. 12 is a perspective view of another aspect of the defrost contact assembly, shown with the cover removed.

As shown in FIG. 12, one of the contact bosses, referred to herein by reference number 172, may be modified to receive two plug-in connectors 160, one connector 160 attached to the harness 162 extending for connection to the contact pad 166 and the other connector 160 being part of a harness 174 passing across the insulator 126 to the connector 164 attachable to the other contact pad 166. This eliminates one contact plate 156 and the boss 152. Routing pins 176 may be formed on the insulator 126 as well as a notch 178 formed in the striker 110 for maintaining the harness 174 in a relatively fixed position relative to the insulator 126.

The contact blades 154 and 156 are electrically coupled to suitable sockets carried in a connector housing 180 and 182 fixed to the second mounting bracket 90 of the module 50. The connector housing 180 and 182 are secured to the bracket 90 by means of at least one fastener and one locating pin or by multiple fasteners. The connector socket carried in the connector housing 180 slidably receives one of the contact blades 154 and 156. The connector sockets in the housings 180 and 182 slidably receive the contact blades 154 and 156 when the flipglass 32 moves to a closed position relative to the liftgate 20. The socket in each connector housing 180 and 182 may be electrically connected to the connector 78 carried on the wipe motor housing and therefrom to a suitable electric power source which is switchably activated by means of an interior switch in the vehicle. The contact blades 154 and 156 automatically separate from the sockets in the connector housings 180 and 182 when the flipglass 32 is pivoted away from the liftgate 20 to the open position.

Another aspect of the present invention is a dead front electrically protective feature provided by the cover 124 and the biasing means or springs 136. When the flipglass 32 is pivoted away from the liftgate 20, the contact blades 154 and 156 separate from the connector housings 180 and 182 carried on the liftgate 20 as the flipglass 32 pivots away from liftgate 20. The biasing means or springs 136 will move the cover 124 away from the base 122 to position shown in FIG. 7 in which the cover 124 substantially encompasses the entire length of the contact blades 154 and 156. This prevents easy contact with the contact blades 154 and 156.

However, when the flipglass 32 is pivoted back toward the liftgate 20 to the closed position, the cover 124 will engage the edge of the bracket 90 overcoming the biasing force of the springs 136 and forcing the cover 124 toward the base 122. This allows the contact blades 154 and 156 to move outwardly through apertures 188 and 190 in the cover 124 for connection with the sockets in the connector housings 180 and 182 thereby completing the electrical circuit to the defrost grid in the flipglass 32.

The biasing means 136 also serve another function. Since the latch claw 106 pulls the striker 110 into the notch 108 to forcibly engage the flipglass 32 with the glass opening seal, release of the claw 106 from the striker 110 removes the closure force. The biasing means or springs 136 are selected with sufficient spring force to push the cover 124 away from the bracket 90 on the module 50 thereby pivoting the lower edge of the flipglass 32 away from the adjacent portion of the liftgate 20. This separation allows a vehicle user to insert his or her fingers behind the bottom edge of the flipglass 32 to manually pivot the flipglass 32 to the fully open position.

Another feature provided by the cover 120 is lateral adjustment of the striker 110 to center the striker 110 with respect to the claw 106 as well as to center the contact blades 154 and 156 with respect to the sockets in the respective connector housings 180 and 182. This lateral adjustment feature is provided by the laterally slidable mounting of the insulator 126 on the base 122 of the cover assembly 120 which is fixed to the flipglass 32.

During closure of the flipglass 32 to the fully closed, sealed position, the striker 110 will engage the notch 108 in the latch mechanism 102 and center itself in the notch 108. The slidable mounting of the base 122 allows any required lateral movement of the striker 110 as necessary for centering of the striker 110 in the notch 108. This lateral adjustment also aligns the contact blades 154 and 156 with the respective sockets in the connector housings 180 and 182 to provide secure alignment of the contact blades 154 and 156 with the connector sockets.

In summary, there has been disclosed a unique module for a liftgate or rear hatch of a motor vehicle which enables multiple components to be mounted on the liftgate or rear hatch in a single assembly operation. The module is capable of carrying one or more of a rear window wiper motor, a rear flipglass latch mechanism and rear glass defrost contact grid electrical connectors.

What is claimed is:

1. An automotive accessory module mountable on a vehicle liftgate having a liftgate window, the module comprising:
   a unitary frame;
   a plurality of vehicle components mounted on the frame, the vehicle components including at least two of a liftgate window wiper motor, a liftgate window latch apparatus, and liftgate window defrost grid contact connectors, the defrost grid contact connectors including at least one electrical contact blade projecting from a base adapted to be fixed to vehicle liftgate window;
   a cover mountable over the at least one electrical contact blade; and
   means, carried on the base and engageable with the cover, for biasing the cover to a first position in which the cover substantially encompasses the at least one electrical contact blade, but enabling the cover to be moved to a second position in which the at least one electrical contact blade projects through the cover for connection to the connector on the module.

2. The module of claim 1 wherein the biasing means comprises:
   at least one spring carried on a support mounted on a base engaged with the cover.

3. The module of claim 2 wherein:
   the biasing means forcibly moves the cover from the first position to the second position to enable separation of an edge of the liftgate window from the liftgate.

4. An automotive accessory module mountable on a vehicle liftgate canying a liftgate window latch, the module comprising:
   a striker coupled to the liftgate window;
   means, carrying the striker, for providing lateral adjustment of the striker with respect to the liftgate latch;
   a cover mountable over the striker; and
   means, engagable with the cover, for biasing the cover to a first position in which the cover encompasses a portion of the striker, but enabling the cover to be moved to a second position in which the striker projects substantially fully through the cover for engagement with a liftgate window latch.

5. The module of claim 4 wherein the biasing means comprises:
   at least one spring carried on a support mounted on a base, the support engaged with the cover.

6. The module of claim 5 wherein:
   the biasing means forcibly moves the cover from the first position to the second position to enable separation of an edge of the liftgate window away from the liftgate.

7. The module of claim 6 further comprising:
   the support canying the liftgate glass latch striker;
   means for movably coupling the support and the striker to a base attachable to the liftgate window.

8. An automotive accessory module mountable on a vehicle liftgate carrying a liftgate window latch, the module comprising:
   a striker coupled to the liftgate window;
   means, carrying the striker, for providing lateral adjustment of the striker with respect to the liftgate latch;
   a cover;
   means, engagable with the cover, for biasing the cover to a normal first position, but enabling the cover to be moved to a second position away from the first position;
   at least one defrost contact connector carried on the module; and
   at least one contact blade carried on a support coupled to the cover for slidable electrical connection and disconnection to the contact connector as the liftgate window is moved between a first position closing an opening in the liftgate and a second position in which at least one edge of the liftgate window is spaced from the liftgate.

9. The module of claim 8 wherein:
   the biasing means forcibly moves the cover from the first position to the second position to enable separation of an edge of the liftgate window from the liftgate.

10. The module of claim 8 further comprising:
    a support carrying the liftgate glass latch striker;
    means for movably mounting the support and the striker with respect to a base adapted to be fixedly attachable to the liftgate window.

11. A method of mounting an automotive component module on a vehicle liftgate having a pivotal liftgate window latchable in a closed position in an opening in the liftgate to a liftgate window latch apparatus, the liftgate window carrying a defrost grid having contact connectors, the method comprising the steps of:
    movable coupling a liftgate window latch striker to the liftgate window wherein the latch striker is continuously movable relative to the liftgate window;
    mounting the striker on a support;
    fixedly attaching a base to the liftgate window;
    movably coupling the support and striker to the base for movement of the support and the striker relative to the base;
    mounting a cover on the support, the cover movable relative to the striker; and
    mounting biasing means on the support and acting on the cover to move the cover between a first normal position in which the cover encompasses at least a portion of the striker and a second position in which the striker is substantially completely exposed from the cover.

12. The method of claim 11 further comprising the steps of:

mounting an electrical terminal on the support so that an end portion of the terminal projects externally through the cover when the cover is in the first position and is substantially enclosed by the cover when the cover is in the second position; and electrically connecting the at least one electrical terminal to a liftgate window defrost grid terminal.

13. The method of claim 11 further comprising the step of:

disposing the biasing means to forcibly move the cover from the first position to the second position when the liftgate window striker is released from the liftgate window latch to separate an edge of the liftgate window from the liftgate.

14. A method of mounting an automotive component module on a vehicle liftgate having a pivotal liftgate window latchable in a closed position in an opening in the liftgate to a liftgate window latch apparatus, the liftgate window carrying a defrost arid having contact connectors, the method comprising the steps of:

movably coupling a liftgate window latch striker to the liftgate window wherein the latch striker is continuously movable relative to the liftgate window;

mounting the striker on a support;

fixedly attaching a base to the liftgate window;

movably coupling the support and striker to the base for continuous movement of the support and the striker relative to the base;

mounting a cover on the support, the cover movable relative to the striker; and mounting biasing means on the support and acting on the cover to move the cover between a first normal position in which the cover encompasses at least a portion of the striker and a second position in which the striker is substantially completely exposed from the cover.

15. The method of claim 14 further comprising the step of:

mounting an electrical terminal on the support so that an end portion of the terminal projects externally through the cover when the cover is in the first position and is substantially enclosed by the cover when the cover is in the second position; and electrically connecting the at least one electrical terminal to a liftgate window defrost grid terminal.

16. The method of claim 14 further comprising the step of:

disposing the biasing means to forcibly move the cover from the first position to the second position when the liftgate window striker is released from the liftgate window latch to separate an edge of the liftgate window from the liftgate.

* * * * *